United States Patent
Bullotta et al.

(10) Patent No.: US 9,800,675 B2
(45) Date of Patent: Oct. 24, 2017

(54) METHODS FOR DYNAMICALLY GENERATING AN APPLICATION INTERFACE FOR A MODELED ENTITY AND DEVICES THEREOF

(71) Applicant: PTC Inc., Needham, MA (US)

(72) Inventors: Rick Bullotta, Phoenixville, PA (US); John Schaefer, Ambler, PA (US)

(73) Assignee: PTC Inc., Needham, MA (US)

( * ) Notice: Subject to any disclaimer, the term of this patent is extended or adjusted under 35 U.S.C. 154(b) by 0 days.

(21) Appl. No.: 15/405,946

(22) Filed: Jan. 13, 2017

(65) Prior Publication Data

US 2017/0126816 A1   May 4, 2017

Related U.S. Application Data

(63) Continuation of application No. 14/751,379, filed on Jun. 26, 2015, now Pat. No. 9,578,082, which is a continuation of application No. 13/678,885, filed on Nov. 16, 2012, now Pat. No. 9,098,312.

(60) Provisional application No. 61/560,371, filed on Nov. 16, 2011.

(51) Int. Cl.
G06F 15/16 (2006.01)
H04L 29/08 (2006.01)

(52) U.S. Cl.
CPC .............. *H04L 67/16* (2013.01); *H04L 67/02* (2013.01)

(58) Field of Classification Search
CPC .......................................................... H04L 67/16
USPC .......................................................... 709/201
See application file for complete search history.

(56) References Cited

U.S. PATENT DOCUMENTS

2007/0294544 A1* 12/2007 Ishikawa ................. G06F 21/10
                                                              713/193
2013/0103817 A1* 4/2013 Koponen ............ G06F 9/45558
                                                              709/223

* cited by examiner

Primary Examiner — Adnan Mirza
(74) Attorney, Agent, or Firm — Meunier Carlin & Curfman LLC

(57) ABSTRACT

This technology generates a plurality of instances of things each including a dynamically generated interface structure and services associated with and properties of the corresponding one of the things. The services associated with and the properties of one of the plurality of instances of things for a selected one of the plurality of instances of things are retrieved and provided. A service definition for a selected one of the services is retrieved and provided based on the retrieved and provided services associated with and properties for the selected one of the plurality of instances of things. A requested consumption call for the selected one of the services is executed based on the retrieved service definition. A defined result set for the executed consumption call is provided in the dynamically generated interface structure associated with the requested one of the plurality of instances of things.

22 Claims, 4 Drawing Sheets

METHODS FOR DYNAMICALLY GENERATING AN APPLICATION INTERFACE FOR A MODELED ENTITY AND DEVICES THEREOF

RELATED APPLICATIONS

This application is a continuation of U.S. application Ser. No. 14/751,379, filed Jun. 26, 2015, which is a continuation of U.S. application Ser. No. 13/678,885, filed Nov. 16, 2012, now issued as U.S. Pat. No. 9,098,312, which claims the benefit of, and priority to, U.S. Provisional Patent Application No. 61/560,371, filed Nov. 16, 2011. The content of each of these applications is incorporated by reference herein in its entirety.

FIELD

This technology relates to methods for generating a dynamic representational state of a thing and devices thereof

BACKGROUND

The connected world, also referred to as the Internet of Things or IOT, is growing quickly. Analysts have estimated that along with the continued growth of humans using the Internet, the number of connected devices and systems will rise from 5 Billion to 1 Trillion in the next 10 years. However, the traditional ways to manage and communicate with these systems has not changed, meaning that all the information from these systems is not accessible or is not able to be correlated in a way that helps people or businesses do their jobs better and more efficiently, find information they are looking for in the proper context, or make this data consumable in a meaningful way. In addition, user expectations for interacting with systems have changed. Social networks and Mashup web pages have become the common way for users to consume data and interact with other people.

There are a variety of specific solutions to handle the rising amount of data found in industry today. They can be categorized into the following: Enterprise Resource Planning (ERP) systems; Portals and related technologies; Traditional Business Intelligence systems; and Manufacturing Intelligence systems.

Enterprise Resource Planning systems are used by large and small companies to run their businesses. The minimal requirement is to provide financial and accounting services. However, these systems typically have functionality for specific vertical industries, such as manufacturing, utilities, construction, retail, etc. These systems are rigid, in both business process support and data models. They are very expensive to implement and maintain. They are implemented to enforce repeatable, standard business processes. Traditionally it has been impossible to use these systems for dynamic business processes or interactive problem solving.

Portals are a way for companies to share information through a thin client (browser). Usually, a number of documents and data sources are used to publish information for a large user base. The information, while searchable, is relatively static and does not address current conditions or interactive problem solving.

Traditional business intelligence solutions usually rely on specific, detailed data models (often data warehouses). While the data is typically "fresh" (about a day old) in these systems, the models are rigid and report writing may require Information Technology (IT) skills. While these solutions have become much better at providing users with the ability to self-serve, the self service capability is restricted to previously designed semantic models. These solutions do not address current conditions, rapidly changing data, third party collaboration, or external data sources.

Manufacturing Intelligence solutions (also referred to as Enterprise Manufacturing Intelligence or EMI) are concerned with the more real-time data that is collected from machines and devices. This data is usually time series data and does not have business context associated with it. The consumers of these applications are usually plant operators and engineers. These applications do not handle other business related data, do not understand or correlate unstructured data, and are not "document" friendly.

The currently utilized solution to pull all these separate sources of data together, so that users can consume data from more than one of these solutions in a meaningful way, is to execute a complex, multi-year integration project that results in a data mart. This usually involves replicating large quantities of data from multiple systems into a rigid model, similar to a hub and spoke model. The hub is the data mart holding all the replicated data. As the systems change at the end of the spokes, new integration and modeling is required. This type of solution is expensive to maintain. The data model and semantics are not dynamic. And the ability to consume the data is available only through pre-defined reports.

Additionally, the traditional applications that rely on relational data bases are adept at answering known questions against known data structures (Known-Known). Search engines and related applications can answer known questions against unknown data structures (Known-Unknown). The problem at hand is how to handle the above scenarios, but also answer unknown questions against known data structures (Unknown-Known), and unknown questions against unknown data structures (Unknown-Unknown).

Most software applications allow a user or developer to manipulate data within the application. Accordingly, existing technologies have developed design tools to assist application software developer in designing an application interface.

Unfortunately, existing interface development technologies and designs have not kept pace with the increasing demand for interfaces. For example, the existing interface development technologies are not equipped to address current conditions, such as rapidly changing data sets which are accessible in different manners, at different locations and in different formats. Attempts with existing interface development technologies to provide self service capability have been limited to previously designed semantic models. Further, many of these design tools require specialized training to be able to use them to develop an application interface.

To meet these increased demands for interfaces, developers of these interfaces need all the required information for the application interface to be easily and readily available. Additionally, developers of these interfaces need to be able quickly obtain and understand all of the relationships that exist within the application. This technology's unique model-based design and development tools enable developers to build and deploy operational solutions in less time than traditional approaches.

SUMMARY

A method for generating a dynamic representational state of a thing includes generating by a data management computing apparatus a plurality of instances of things. Each of the instances of things comprises a dynamically generated interface structure and one or more services associated with and one or more properties of the corresponding one of the things. The one or more services associated with and the one or more properties of one of the plurality of instances of things for a selected one of the plurality of instances of things are retrieved and provided by the data management computing apparatus. A service definition for a selected one of the one or more services is retrieved and provided by the management computing apparatus based on the retrieved and provided one or more services associated with and one or more properties for the selected one of the plurality of instances of things. A requested consumption call for the selected one of the services is executed by the data management computing apparatus based on the retrieved service definition. A defined result set for the executed consumption call is provided by the data management computing apparatus in the dynamically generated interface structure associated with the requested one of the plurality of instances of things.

A non-transitory computer readable medium having stored thereon instructions for generating a dynamic representational state of a thing comprising machine executable code which when executed by at least one processor, causes the processor to perform steps including generating a plurality of instances of things. Each of the instances of things comprises a dynamically generated interface structure and one or more services associated with and one or more properties of the corresponding one of the things. The one or more services associated with and the one or more properties of one of the plurality of instances of things for a selected one of the plurality of instances of things are retrieved and provided. A service definition for a selected one of the one or more services is retrieved and provided based on the retrieved and provided one or more services associated with and one or more properties for the selected one of the plurality of instances of things. A requested consumption call for the selected one of the services is executed based on the retrieved service definition. A defined result set for the executed consumption call is provided in the dynamically generated interface structure associated with the requested one of the plurality of instances of things.

A data management computing apparatus comprising one or more processors, a memory coupled to the one or more processors which are configured to execute programmed instructions stored in the memory includes generating a plurality of instances of things. Each of the instances of things comprises a dynamically generated interface structure and one or more services associated with and one or more properties of the corresponding one of the things. The one or more services associated with and the one or more properties of one of the plurality of instances of things for a selected one of the plurality of instances of things are retrieved and provided. A service definition for a selected one of the one or more services is retrieved and provided based on the retrieved and provided one or more services associated with and one or more properties for the selected one of the plurality of instances of things. A requested consumption call for the selected one of the services is executed based on the retrieved service definition. A defined result set for the executed consumption call is provided in the dynamically generated interface structure associated with the requested one of the plurality of instances of things.

Accordingly, this technology provides a number of advantages including providing methods, non-transitory computer readable medium and apparatuses that more easily and effectively generate and provide through an interface a dynamic representational state of a thing. With this technology all of the interrelationships which exist in the dynamic representational state information are easily and readily available. Additionally, with this technology no specialized training is required.

DETAILED DESCRIPTION

Figure 1A:
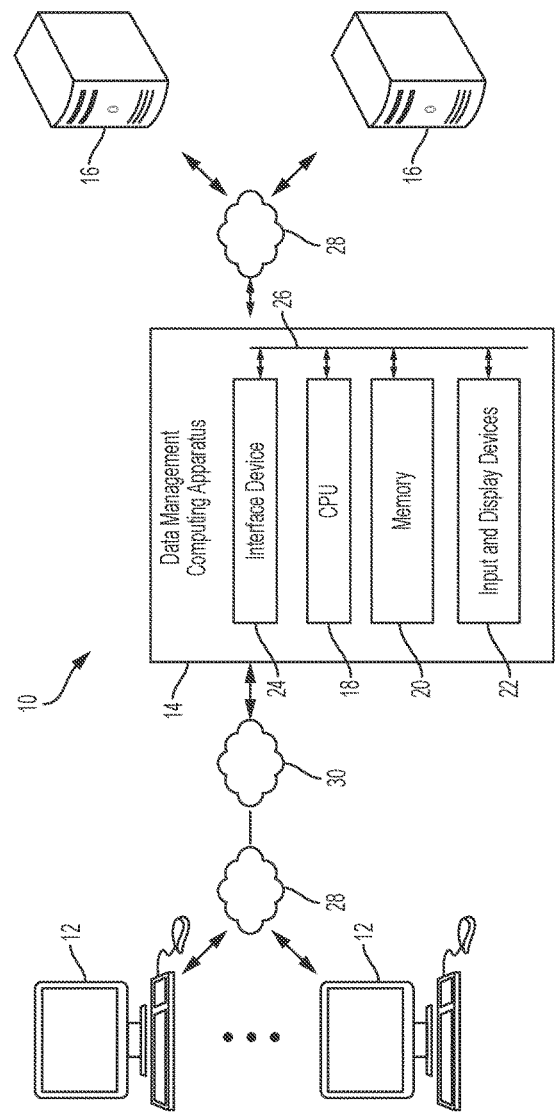
FIG. 1A is a diagram of an exemplary network environment which comprises a data management computing apparatus for generating and providing through an interface a dynamic representational state of a thing.

The platform described by this technology defines a model driven development architecture in which the model has entities, which typically represent physical assets/devices, computer applications and systems, and people. Entities can also represent data objects and platform services. Each entity has its own properties and services and can fire and consume events. All entities are treated as equal collaborators in any applications that utilize the underlying capabilities of the system. A data management computing apparatus provides a number of functions including dynamically generating application interfaces for accessing modeled data from one or more data servers, although other numbers and types of systems can be used and other numbers and types of functions can be performed.

A consumer computing device utilizes the dynamically generated interfaces provided by the data management computing apparatus to access modeled data and other information from one or more data servers. Each of the data servers enter, update and/or store content, such as files and directories, although other numbers and types of functions can be implemented and other types and amounts of data could be entered, updated, or stored used. The data servers may include by way of example only, Enterprise Resource Planning (ERP) systems; Portals and related technologies; Traditional Business Intelligence systems; and Manufacturing Intelligence systems.

A service is simple or complex function provided on the server, which is accessible via the application REST interface. A service has inputs, processing, and outputs.

An event is a simple or complex change of data and/or status of an entity. An event has a well defined complex data output that is sent to each event subscriber when the event is detected.

An Entity is any object in the model.

A Thing is typically an instance of a Thing Template. A Thing Template is itself an abstract class that can inherit from one or more Thing Shapes. Properties, services, and events can be defined at the Thing Shape, Thing Template or Thing instance. If a Thing Template inherits from one or more Thing Shapes, all the properties, events, and services of the Thing Shapes are part of the Thing Template. When a Thing instance is created from a Thing Template, all properties, events, and services of the Thing Template are realized within the Thing instance.

Data objects are represented as InfoTables and Streams. InfoTables and Streams are described and defined by DataShapes, which are reusable, abstract data object definitions. An Info Table can be similar to a relational database table, which represents a two dimensional data object (columns and rows). An InfoTable can also represent much more complex representations of data, because an column within an InfoTable can itself be an InfoTable, allowing ann-tier hierarchical data representation. A Stream is designed to capture time series data. Time series data is the data that is most often found as part of the communication flow for devices and machines. Streams and InfoTables also have services and events.

Within this system, developers model the Things (people, systems and real world equipment/devices) in their world, independent of any specific use case. Things are augmented projections of their real world equivalents containing the complete set of data, services, events, historical activities, collaboration, relationships and user interfaces that define it and its place in the world. These Things can then be easily combined into solutions, tagged and related into industrial social graphs, searched/queried/analyzed, and mashed up into new operational processes.

This technology enables applications that are "dynamic" in that they continuously evolve and grow over time. As the application runs, it continuously collects and indexes new data about the entities in the model, which allows more data to be mined and searched over time. This technology provides the basis for this evolution, allowing users to answer questions, solve problems, and capture opportunities that have not even been anticipated.

All entities can, based on authorizations, subscribe to any other entities events and can consume other entity services. When an entity is defined, it is immediately discoverable through a standard Representational State Transfer (REST) interface over HTTP or HTTPS. Therefore, the complete model namespace is available over a dynamic REST interface. Whatever a user defines the model to be appears as a REST interface. The REST interface for the model also includes a full description of the properties, services, and events for each entity. The REST interface for the namespace describes how to consume services for each entity in the model. As soon as a new Thing is defined in the model, the full set of services and data for the Thing is available as a set of REST interfaces.

The dynamic REST interface is based on an inheritance or object oriented model. If a new service, property, or capability is defined at the Thing Shape or Thing Template level, each Thing instance that is derived from those entities immediately inherits that service, property or capability.

Applications built on the platform described by the technology, such as Mashup web pages, can expose these new capabilities automatically, without any changes to the application definition.

Any third party application can consume and contribute to the applications created using the platform described by the technology through the open REST interfaces.

A person can consume and contribute to the application created using the platform described by the technology through the open REST interfaces by using any Internet browser, without any programming.

A machine or device can consume or contribute to this application through the open REST interfaces. For example, an instrument can write time series data to a Stream through a REST interface.

The model and the corresponding interfaces that are dynamically generated by the server platform created using the platform described by the technology, are configured without any programming or technical expertise, using the technology's modeling environment.

An exemplary environment 10 with a data management computing apparatus 14 that generates and provides through an interface a dynamic representational state of a thing is illustrated in FIG. 1A. In this particular example, the environment 10 includes a data management computing apparatus 14, a plurality of consumer computing device 12, and a plurality of data servers 16 which are coupled together by the Local Area Network (LAN) 28 and Wide Area Network (WAN) 30, although the environment 10 can include other types and numbers of devices, components, elements and communication networks in other topologies and deployments. While not shown, the exemplary environment 10 may include additional components, such as routers, switches and other devices which are well known to those of ordinary skill in the art and thus will not be described here. This technology provides a number of advantages including providing methods, non-transitory computer readable medium and apparatuses that more easily and effectively generate and provide through an interface a dynamic representational state of a thing.

Referring more specifically to FIG. 1A, the data management computing apparatus 14 provides a number of functions including generating a dynamic representational state of a thing, although other numbers and types of systems can be used and other numbers and types of functions can be performed. The data management computing apparatus 14 includes at least one processor 18, memory 20, input and display devices 22, and interface device 24 which are coupled together by bus 26, although data management computing apparatus 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2:
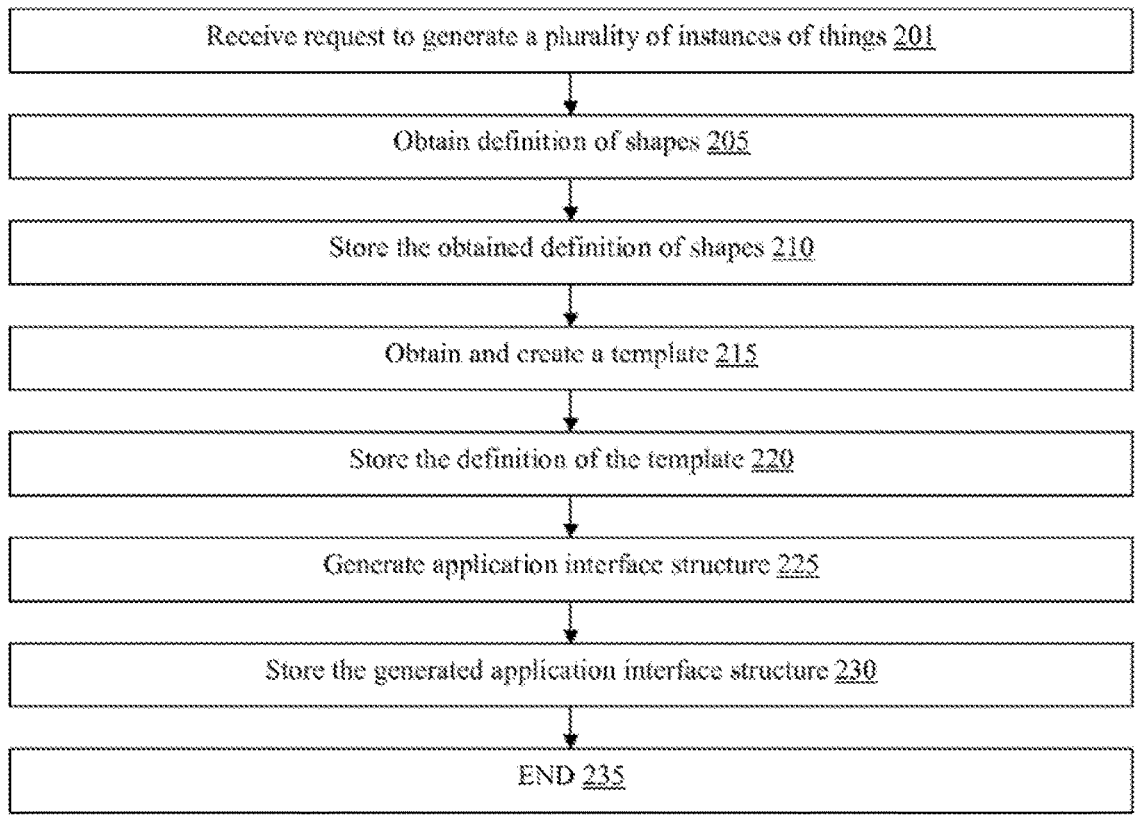
FIG. 2 is a flowchart of an exemplary method for dynamically generating one or more of a plurality of instances of things.
Figure 3:
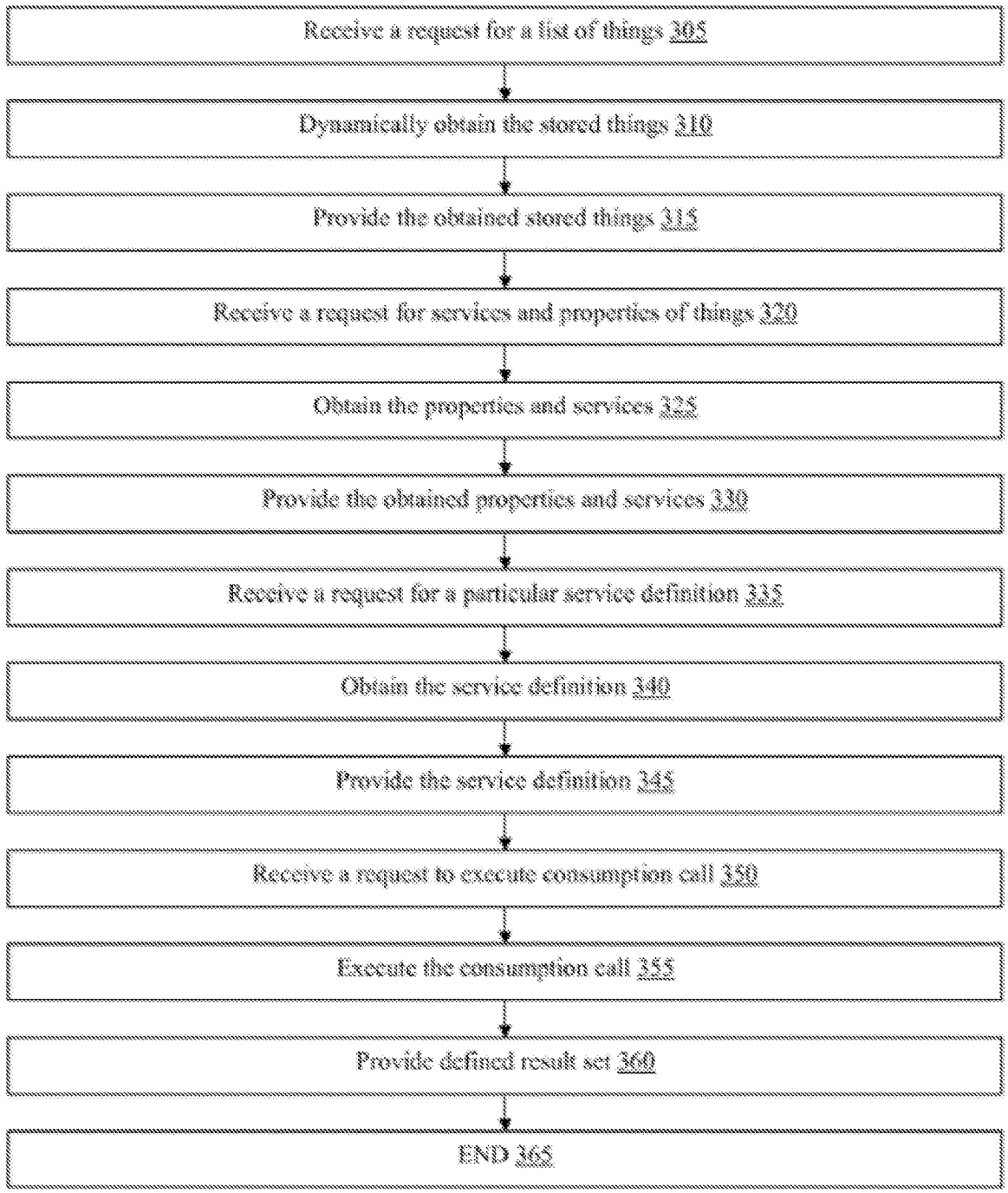
FIG. 3 is a flowchart of an exemplary method for generating and providing through an interface a dynamic representational state of a thing.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIGS. 2 and 3 is representative of example steps or actions of this technology that may be embodied or expressed as one or more non-transitory computer or machine readable instructions stored in memory 20 that may be executed by the processor(s) 18.

Input and display devices 22 enable a user, such as an administrator, to interact with the data management computing apparatus 14, such as to input and/or view data and/or to configure, program and/or operate it by way of example only. Input devices may include a touch screen, keyboard and/or a computer mouse and display devices may include a computer monitor, although other types and numbers of input devices and display devices could be used. Additionally, the input and display devices 22 can be used by the user, such as an administrator to develop applications using an application interface.

The interface device 24 in the data management computing apparatus 14 is used to operatively couple and communicate between the data management computing apparatus 14, the client computing device 12, and the plurality of data servers which are all coupled together by LAN 28 and WAN 30. By way of example only, the interface device 24 can use TCP/IP over Ethernet and industry-standard protocols, including NFS, CIFS, SOAP, XML, LDAP, and SNMP although other types and numbers of communication protocols can be used.

Each of the consumer computing devices 12 includes a central processing unit (CPU) or processor, a memory, an interface device, and an I/O system, which are coupled together by a bus or other link, although other numbers and types of network devices could be used. Each of the consumer computing devices 12 communicates with the data management computing apparatus 14 through LAN 28, although the consumer computing devices 12 can interact with the data management computing apparatus 14 by any other means. The consumer computing device 12 utilizes the dynamically generated interface provided by the data management computing apparatus 14 to access modeled data and other information from one or more data servers 16.

Each of the plurality of data servers 16 includes a central processing unit (CPU) or processor, a memory, an interface device, and an I/O system, which are coupled together by a bus or other link, although other numbers and types of network devices could be used. Each of the plurality of data servers 16 enters, updates and/or store content, such as files and directories, although other numbers and types of functions can be implemented and other types and amounts of data could be entered, updated, or stored used. Each of the plurality of data servers 16 may include by way of example only, enterprise resource planning (ERP) systems, portals and related technologies, traditional business intelligence systems and manufacturing intelligence systems.

Although an exemplary environment 10 with the consumer computing devices 12, the data management computing apparatus 14 and the plurality of data servers 16 are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

EXAMPLES

As an example, to build a monitoring and management application for a fleet of delivery trucks, you need to model the trucks. Let's assume each truck has the following attributes: Assigned Driver, Location, and Delivery Schedule. It has the following services: Change Driver, Update Location, Modify Schedule, List Schedule, and Get Schedule Execution Details.

A refrigerated truck Thing Shape is defined that has the following attributes: Temperature; Ambient Temperature; Compressor Run Hours; and Next Scheduled Compressor Maintenance Date. Now define a Thing Template that implements both the Truck Thing Shape and the refrigerated truck Thing Shape. Now you can define instances of all your refrigerated trucks using this Thing Template.

All entities defined are available for inspection through REST interfaces. All services defined can be consumed through REST interfaces for each defined truck. All truck data properties can be set/get through REST interfaces. No programming is required to have the REST interfaces enabled, it is all dynamically available through the platform described by this technology. If a change to a service at the ThingShape is made, all truck instances immediately and automatically reflect that change, and all changes are reflected in the REST interfaces.

Figure 1B:
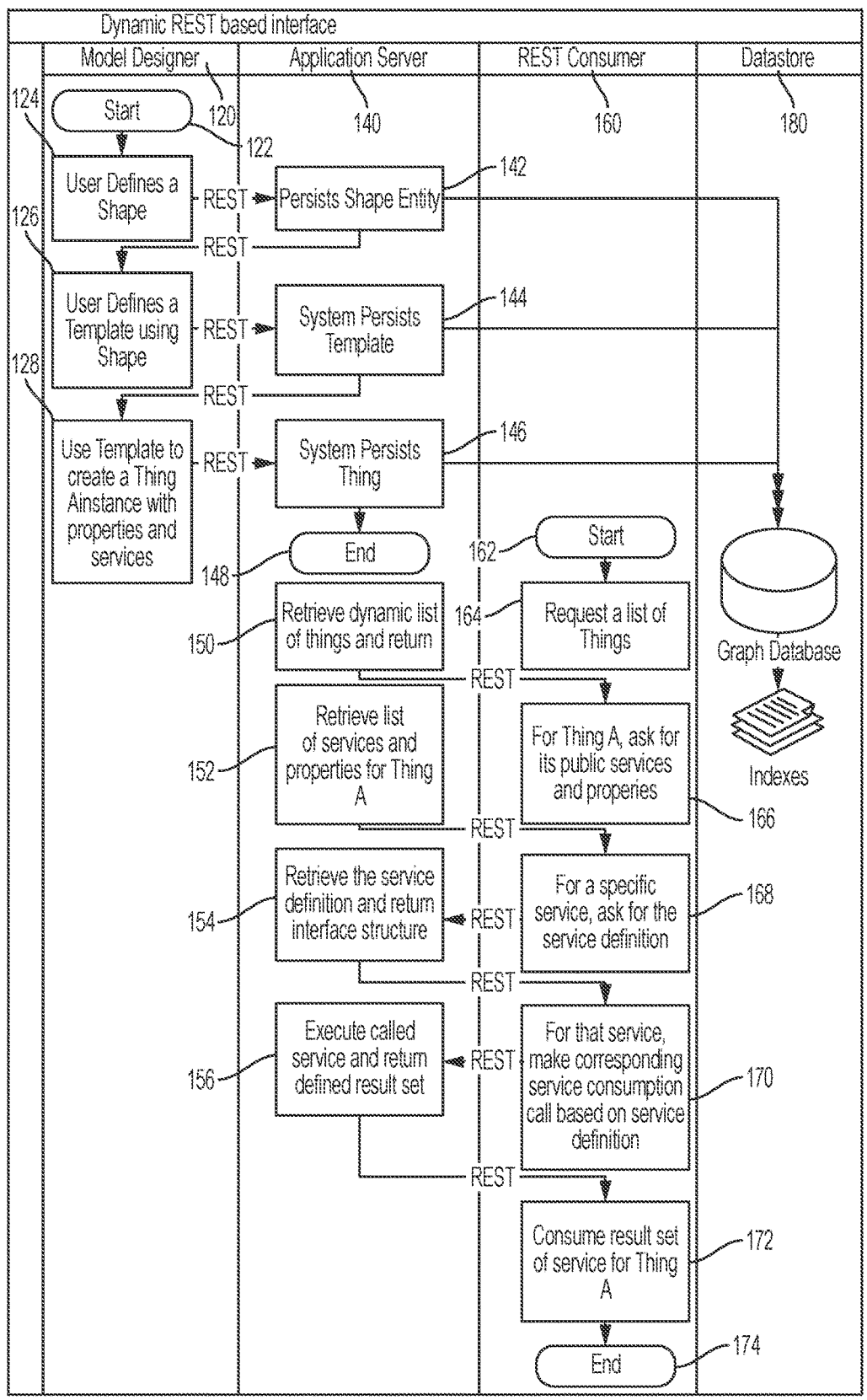
FIG. 1B is a flowchart of a method for dynamically generating a Representational State Transfer (REST) interface while creating a computer model of one or more entities.

Referring now to FIG. 1B, an exemplary functional diagram which illustrates dynamically generating a REST interface during networked system modeling activity in accordance with embodiments of the present invention is illustrated. In this particular example, a model designer 120, which can be a human or another computer device, defines a model of another entity via a REpresentational State Transfer (REST) interface on an application server 140. The model contains a hierarchical representation of the system being modeled. The base component of the model is one or a plurality of "Shapes" 142. Shapes expose certain capabilities of the entity being modeled such as properties, services, events and subscriptions. One or more Shapes are then combined to form a Template 144 which inherits all of the characteristics of each Shape it implements. As each of these entities is created, they are persisted in a non-volatile data store 180 which also tags the model information with relational data regarding this particular entity and how it relates to the other entities in the model. The resulting Template is a non-specific, noninstantiated software representation of the entity being modeled. To instantiate a specific instance of the model the user creates a "Thing" 146 whose entity specific information is stored in either or both of a volatile or non-volatile data store and is also tagged with the appropriate model relationship information.

As the model is developed or altered in the future, the information regarding both the structure of the model and any Thing specific runtime information are made accessible via a Web Services interface provided by the Application Server 140. In this particular example, a web service consumer 160, which can be a plurality of humans, applications, devices, or other computer systems, requests information regarding the model using the dynamically generated REST interface, in this example the request is for a list of Things 164. Upon receiving the request, the Application Server queries the data store and returns the complete list of instantiated Things 150. The web service consumer is then able to query the application server for a list of a specific Thing's characteristics 166 as defined and tagged during the modeling phase. Application Server queries the data store for the relevant list of services and returns those services along with their interface structure 152.

Continuing this example, the web service consumer than requests more detailed information regarding a specific service 168. The Application Server retrieves this information from the data store and returns the service's interface structure 154. At this point the web service consumer now has enough information to invoke the service for that Thing instance 170, and consume the result set 172 provided by the application server.

The unique and innovative aspect of this approach is that the model composer did not have to explicitly create the web service interface. Purely through the action of creating the model, the appropriate REST interfaces were generated and made accessible to the consumer of the web service.

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for dynamically generating one or more of a plurality of instances of things will now be described with reference to FIGS. 1A-2. In step 201, the data management computing apparatus 14 receives a request to generate one or more of a plurality of instances of things from a consumer computing device 12, although this process can be initiated in other manners, such as by the data management computing apparatus 14.

Next, in step 205 the data management computing apparatus 14 obtains a defined shape for a modeled entity which is referred to in this patent application as a thing, from the requesting consumer computing device 12, although the data management computing apparatus 14 may obtain the defined shape from other sources, such as from one of the plurality of data servers 16 by way of example only. In these examples, a thing refers to people, apparatuses, systems, electronic or mechanical devices, components or other elements which are projections of real world equivalents containing sets of data, services, events, historical activities, collaboration, relationships and user interfaces that define it and its place in the real world. Additionally, in these examples shape refers to attributes of the thing which is being generated, such as events, service definitions, or services and subscriptions offered by the thing.

In step 210, the data management computing apparatus 14 stores the obtained defined shapes for the thing in memory 20 in one or more graph databases and indexes, although the data management computing apparatus 14 can store the obtained defined shapes for the thing at a different memory location, such as at one of the plurality of data servers 16 by way of example only. Additionally, in this technology, the data management computing apparatus 14 assigns tags to the obtained defined shape of the thing while storing the obtained defined shape and further stores the assigned tag and the exact memory location in the indexes present within the memory 20. By assigning tags and storing the obtained definition in the memory 20 and by using the indexes, the technology illustrated in this application provides rapid retrieval of the stored information In step 215, the data management computing apparatus 14 obtains a defined template from the requesting consumer computing device 12, although the data management computing apparatus 14 can obtain the defined template from other sources, such as from one of the plurality of data servers 16.

In step 220, the data management computing apparatus 14 stores the defined template using techniques as illustrated in step 210.

In step 225, the data management computing apparatus 14 generates an application interface structure for the instance of the thing based on the defined shape, the defined template and the properties and services of the thing. The generated application interface structure for the thing also includes service definitions which can be obtained from one or more of the plurality of data servers 16, although the generated application interface can include other types and amounts of information relating to the thing.

In step 230, the data management computing apparatus 14 stores the instance of the thing with the generated application interface structure, the service definitions, list of all properties and services offered by the thing, the defined shape and the defined template. This exemplary method can be repeated to generate additional instance of things in the exemplary manner described herein and then ends in step 235. By following the above exemplary steps to generate an application interface structure, this technology assists developers to build and deploy operational interface structures which are more dynamic and easier to use and navigate in less time than was possible with prior approaches.

An exemplary method for generating and providing through an interface a dynamic representational state of a thing will now be described with reference to FIGS. 1 and 3. In step 305 the data management computing apparatus 14 receives a request from a consumer computing device 12 for a list of things, although the data management computing apparatus 14 can receive any other types and numbers of requests from the consumer computing device 12. Next, in step 310 the data management computing apparatus 14 obtains the list of things from memory 20, although data management computing apparatus 14 can obtain the list of things from other sources and in other manners. Next, in step 315 the data management computing apparatus 14 provides the obtained list of things to the requesting consumer computing device 12.

In step 320, the data management computing apparatus 14 receives another request from the consumer computing device 12 for the services and properties of the previously requested thing based on a selection of the one thing instances from the previously provided list. Next, in step 325, the data management computing apparatus 14 obtains the properties and services associated with the requested thing from the stored instance of the thing in memory 20, although the properties and services associated with the requested thing could be obtained from other sources in other manners. Next, in step 330, the data management computing apparatus 14 provides the obtained properties and services associated with the requested thing to the requesting consumer computing device 12.

In step 335, the data management computing apparatus 14 receives another request from the consumer computing device 12 for a particular service definition for one of the previously provided services in the instance of the thing associated with the requested thing. Next, in step 340, the data management computing apparatus 14 obtains the service definition for the requested service from memory 20, although the service definition could be obtained from other sources in other manners. Next, in step 345 the data management computing apparatus 14 provides the service definition to the requesting consumer computing device 12 using techniques illustrated in step 310.

In step 350, the data management computing apparatus 14 receives a request to execute a consumption call for the thing relating to the previously provided service definition from the consumer computing device 12. Next, in step 355 the data management computing apparatus 14 executes the requested consumption call for the service definition associated with a service of the requested thing, although other types and numbers of functions could be executed.

In step 360, upon executing the consumption call, the data management computing apparatus 14 provides the defined result set for the executed consumption call in the dynamically generated interface structure associated with the requested one of the plurality of instances of things to the requesting one of the consumer computing device 12. Next, the steps above can be repeated again in response to another request, otherwise this exemplary method ends in step 365.

Accordingly, as illustrated and described with the examples herein this technology provides methods, non-transitory computer readable medium and apparatuses that more easily and effectively generate and provide through an interface a dynamic representational state of a thing. With this technology all of the interrelationships which exist in the dynamic representational state information are easily and readily available. Additionally, with this technology no specialized training is required.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A computer-implemented method for managing a plurality of dynamic data models corresponding to entities, the method comprising:
   storing, by a processor of a computing device, at a memory communicatively coupled to the processor, a plurality of template data models,
      wherein each of the plurality of template data models is associated with definition components selected from the group consisting of properties, services, events and subscriptions,
      wherein the plurality of template data models are used to create the plurality of dynamic data models, such that each of the plurality of dynamic data models includes (i) one or more definition components of the corresponding template data models, and (ii) a web service interface for accessing and editing the definition components of the corresponding template data models;
   receiving, by the processor, a first request to add a first definition component to the definition components of a first template data model of the plurality of template data models;
   causing, by the processor, in response to the first request, the first template data model to be dynamically updated to include the first definition component; and
   causing, by the processor, in response to the first request, the web service interfaces of the plurality of dynamic data models created using the first template data model defined by at least the first template data model to provide accessibility to and editability of the definition components of the first template data model, including the first definition component,
   wherein the entities corresponding to the dynamic data models are selected from the group consisting of physical assets, physical devices, computing devices, and people.

2. The computer-implemented method of claim 1, the method further comprising:
   generating a first dynamic data model using at least a first template data model of the plurality of template data models,
   wherein the generating the first dynamic data model includes:
      creating at least one web service interface corresponding to the first dynamic data model, wherein the at least one web service interface provides access to the definition components to which the first dynamic data model is associated.

3. The computer-implemented method of claim 1, wherein the definition components of each of the plurality of template data models are grouped into shape data models, and
wherein each of the plurality of template data models is defined at least in part by one or more of the shape data models.

4. The computer-implemented method of claim 3, the method further comprising:
   receiving, by the processor, a second request to add a second definition component to the definition components of a first shape data model of the shape data models;
   causing, by the processor, in response to the second request, template data models defined by at least the first shape data model to be dynamically updated to include the second definition component; and
   causing, by the processor, in response to the second request, the web service interfaces of the plurality of dynamic data models created using the template data models defined by at least the first shape data model to provide accessibility to and editability of the definition components of the first shape data model, including the second definition component.

5. The computer-implemented method of claim 4, wherein the web service interfaces include Representational State Transfer (REST) interfaces.

6. The computer-implemented method of claim 5, wherein each of the plurality of dynamic data models includes multiple web service interfaces.

7. The computer-implemented method of claim 6, wherein each of the multiple web service interfaces of the plurality of dynamic data models is associated with a corresponding definition component.

8. The computer-implemented method of claim 3, wherein the template data models inherit the definition components associated with the shape data models by which they are defined.

9. The computer-implemented method of claim 1, wherein a service type definition component is accessible via a web service interface, and wherein the service is associated with one or more functions provided on an interconnected computing device.

10. The computer-implemented method of claim 1, wherein a template data model is a generic, non-specific, non-instantiated dynamic representation of an entity, and
wherein a dynamic data model is a specific instance of an entity.

11. The computer-implemented method of claim 2, wherein, upon generating the first dynamic data model, the first dynamic data model is discoverable via the corresponding at least one web service interface.

12. A system for managing a plurality of dynamic data models corresponding to entities, the system comprising:
a processor; and
a memory having instructions stored thereon, wherein the instructions, when executed by the processor, cause the processor to:
store at a memory communicatively coupled to the processor, a plurality of template data models,
wherein each of the plurality of template data models is associated with definition components selected from the group consisting of properties, services, events and subscriptions,
wherein the plurality of template data models are used to create the plurality of dynamic data models, such that each of the plurality of dynamic data models includes (i) one or more definition components of the corresponding template data models, and (ii) a web service interface for accessing and editing the definition components of the corresponding template data models;
receive a first request to add a first definition component to the definition components of a first template data model of the plurality of template data models;
cause in response to the first request, the first template data model to be dynamically updated to include the first definition component; and
cause in response to the first request, the web service interfaces of the plurality of dynamic data models created using the first template data model defined by at least the first template data model to provide accessibility to and editability of the definition components of the first template data model, including the first definition component,
wherein the entities corresponding to the dynamic data models are selected from the group consisting of physical assets, physical devices, computing devices, and people.

13. The system of claim 12, wherein the instructions, when executed by the processor, cause the processor to:
generate a first dynamic data model using at least a first template data model of the plurality of template data models,
wherein the first dynamic data model is generated by creating at least one web service interface corresponding to the first dynamic data model, wherein the at least one web service interface provides access to the definition components to which the first dynamic data model is associated.

14. The system of claim 12, wherein the definition components of each of the plurality of template data models are grouped into shape data models, and
wherein each of the plurality of template data models is defined at least in part by one or more of the shape data models.

15. The system of claim 14, wherein the instructions, when executed by the processor, cause the processor to:
receive a second request to add a second definition component to the definition components of a first shape data model of the shape data models;
cause in response to the second request, template data models defined by at least the first shape data model to be dynamically updated to include the second definition component; and
cause in response to the second request, the web service interfaces of the plurality of dynamic data models created using the template data models defined by at least the first shape data model to provide accessibility to and editability of the definition components of the first shape data model, including the second definition component.

16. The system of claim 15, wherein the web service interfaces include Representational State Transfer (REST) interfaces.

17. The system of claim 16, wherein each of the plurality of dynamic data models includes multiple web service interfaces.

18. The system of claim 17, wherein each of the multiple web service interfaces of the plurality of dynamic data models is associated with a corresponding definition component.

19. The system of claim 14, wherein the template data models inherit the definition components associated with the shape data models by which they are defined.

20. The system of claim 12, wherein a service type definition component is accessible via a web service interface, and wherein the service is associated with one or more functions provided on an interconnected computing device.

21. The system of claim 12, wherein a template data model is a generic, non-specific, non-instantiated dynamic representation of an entity, and
wherein a dynamic data model is a specific instance of an entity.

22. The system of claim 13, wherein, upon generating the first dynamic data model, the first dynamic data model is discoverable via the corresponding at least one web service interface.

* * * * *